Aug. 13, 1974 W. F. TUCKER 3,829,382

DOPING CONTROL FOR SEMICONDUCTOR MATERIALS

Filed May 15, 1972 2 Sheets-Sheet 1

INVENTOR

WILLIAM F. TUCKER

BY William J. Bethune

ATTORNEY

INVENTOR
WILLIAM F. TUCKER
BY
William J. Bethurum
ATTORNEY

United States Patent Office 3,829,382
Patented Aug. 13, 1974

3,829,382

DOPING CONTROL FOR SEMICONDUCTOR MATERIALS

William F. Tucker, St. Louis, Mo., assignor to Monsanto Company, St. Louis, Mo.

Continuation-in-part of abandoned application Ser. No. 68,827, Sept. 2, 1970. This application May 15, 1972, Ser. No. 253,399
Int. Cl. H01l 7/42, 7/44
U.S. Cl. 252—62.3 R 4 Claims

ABSTRACT OF THE DISCLOSURE

The impurity concentration of a semiconductor material being processed, such as by zone refining, is precision controlled by flowing a dopant gas to a time-controlled proportioning device which feeds a preselected fraction of the dopant to the semiconductor material. The dopant gas flows at a constant flow rate and constant pressure to the proportioning device thereby eliminating memory or storage effects in the doping system and improving the doping control of the processed material.

RELATED APPLICATION

Figure 1:
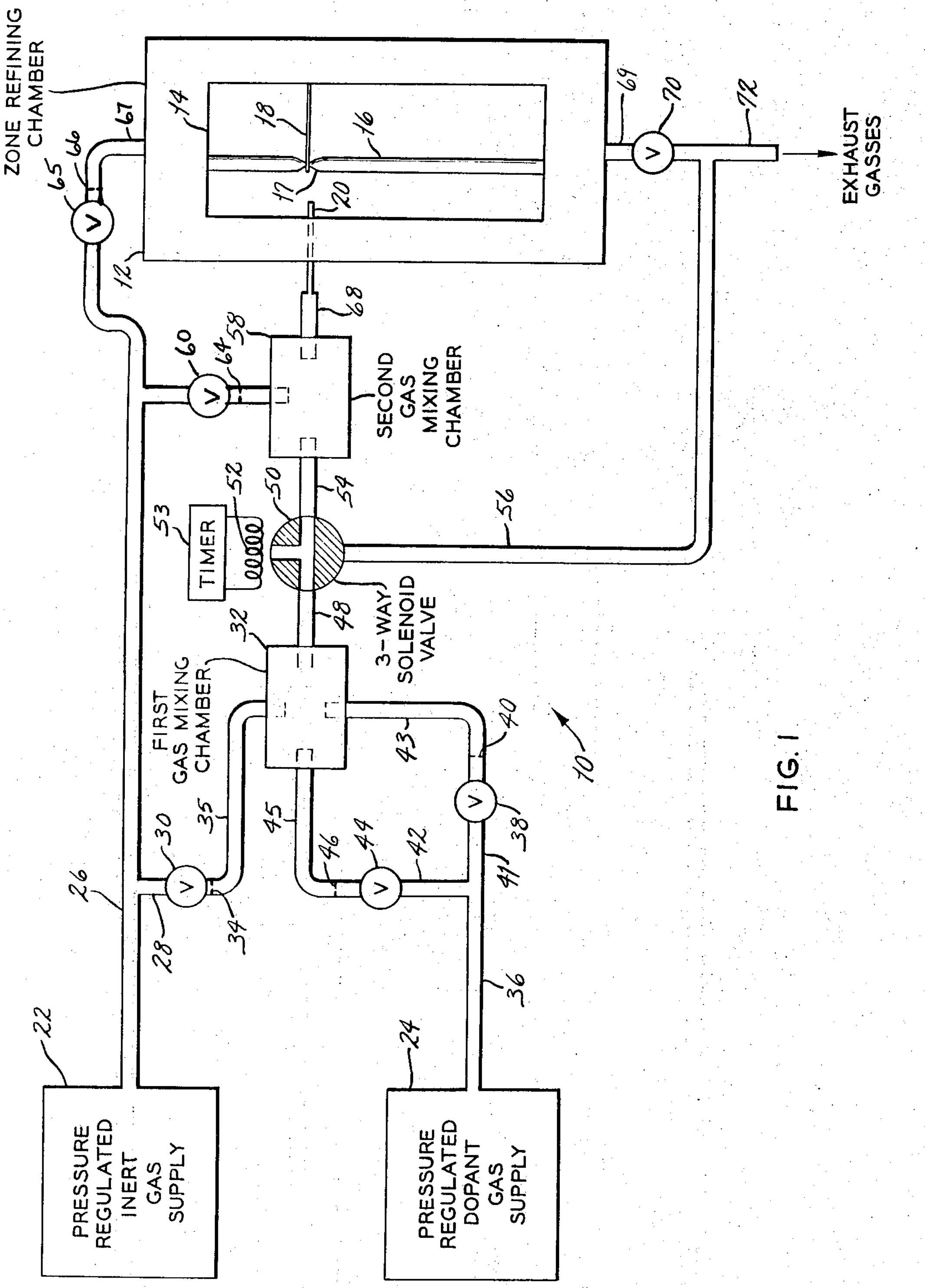

This application is a continuation-in-part application of my copending application Ser. No. 68,827, filed Sept. 2, 1970, now abandoned.

FIELD OF THE INVENTION

This invention relates generally to the control of impurity levels in semiconductive materials and more particularly to an improved system and process for the precision gas doping of zone refined semiconductive materials.

BACKGROUND OF THE INVENTION

During certain zone refining processes used in preparing monocrystalline semiconductive materials, it is a common practice to continuously gas-purge a zone refining chamber in which the semiconductive material is treated in order to displace the air or other gases therein. Since oxygen adversely reacts with the zone refined semiconductive material, this gas purging step is utilized to minimize the oxygen content in the zone refining chamber. Furthermore, it is well known in the zone refining art to combine in the zone refining chamber a selected dopant gas, such as phosphine, with a selected inert gas, such as helium, krypton or argon, to form the gaseous purge mixture which is used to establish a desired impurity level (and thus a desired resistivity) in the zone refined semiconductive material. Conventionally, this purging gas mixture is continuously introduced into the chamber of a zone refiner throughout a zone refining operation, including one or several zone passes along a semiconductor rod.

DESCRIPTION OF THE PRIOR ART

In the past, if it was desired to change the impurity level in and thus the resistivity of a zone refined semiconductive material, e.g. an elongated silicon rod, the dopant gas flow rate to the zone refining chamber was changed proportionately by altering the pressure of the gas line or lines which bring the dopant gas into the zone refining chamber. For example, an increase or decrease in the dopant gas flow rates to zone refined silicon or germanium would increase or decrease, respectively, the impurity concentration in these materials.

While the above-described prior art doping process provided a certain level of impurity control in the resultant zone refined semiconductive materials, this process was characterized by undesirable memory or storage effects which resulted in imprecise doping control during a semiconductor zone refining operation. The walls of typical gas lines and other gas handling and processing equipment in the dopant gas flow control system for a zone refiner are known to absorb a certain amount of the dopant gas flowing adjacent thereto, Therefore, when these walls are subjected to sufficient changes in pressure prior to or during a zone refining operation, this absorption factor prevents the rapid and linear conversion from changes in the gas pressure in the gas flow lines to corresponding changes in impurity concentration in the zone refining chamber. Even stainless steel, which is commonly used as the pipe material for dopant gas lines, exhibits a finite amount of gas absorption. Using a critical orifice in the gas lines, changes in pressure can be directly correlated to the changes in the gas flow rate therein. But neither of these latter two parameters can be used to rapidly and linearly control the impurity concentration in the zone refiner do to the above mentioned gas absorption effects in the gas lines of the variable pressure prior art system.

For example, if the pressure of the dopant gas in the prior art process is in the order of 150 p.s.i., corresponding to a relatively high doping level, and it is desired to drop this pressure to 30 p.s.i., corresponding a relatively low doping level, then due to the gas memory or storage (absorption) effects exhibited by the gas lines in the system, the system can not immediately be changed to the desired impurity concentration corresponding to 30 p.s.i. Instead, the system will require a certain response or settling time to reach the desired lower impurity concentration corresponding to 30 p.s.i., and until this settling time has passed, the gas lines which were previously under the higher pressure of 150 p.s.i. will continue to release a finite amount of stored dopant gas into the system. This continued release of impurities from the walls of the gas lines during this settling time will increase the total amount of impurities within the zone refining chamber above the amount of impurities corresponding to the lower 30 p.s.i. pressure in the system. Similarly, if a relatively low gas pressure of 30 p.s.i. is abruptly changed to 150 p.s.i., for example, the storage effect absorption of the walls of the dopant gas line will not permit the impurity level in the zone refining chamber to immediately be elevated to a value corresponding to 150 p.s.i. of gas pressure. Thus, it is seen that the above storage effects of the prior art gas doping system are inconsistent with the desired precision control of the doping of semiconductors, such as zone refined silicon and germanium rods.

SUMMARY OF THE INVENTION

The general purpose of this invention is to provide an improved high precision gas control process and system for controlling the impurity concentration in zone refined semiconductive materials. This invention possesses none of the aforedescribed disadvantages associated with the memory or storage effects which are inherent in the variable pressure prior art gas doping and purging systems. To attain this purpose, the present invention provides duty-cycle time-programmed control of a dopant gas which is mixed with a selected inert gas and then passed to the semiconductive materials being processed. This process and its associated gas proportioning system operates at a substantially constant pressure during changes in dopant gas concentration in the system, and the impurity concentration of the semiconductive material being processed is varied as a function of the time that a selected dopant gas is passed to the semiconductive material being processed, such as zone refined silicon and germanium.

Accordingly, an object of this invention is to provide a new and improved process for controlling the impurity concentration of gas doped semiconductive materials.

Another object of this invention is to provide a new and improved gas control system for precisely controlling the resistivity of zone refined semiconductive materials.

These and other objects and features of this invention will become more fully apparent from the following description of the acompanying drawings.

DRAWING

Figure 2:
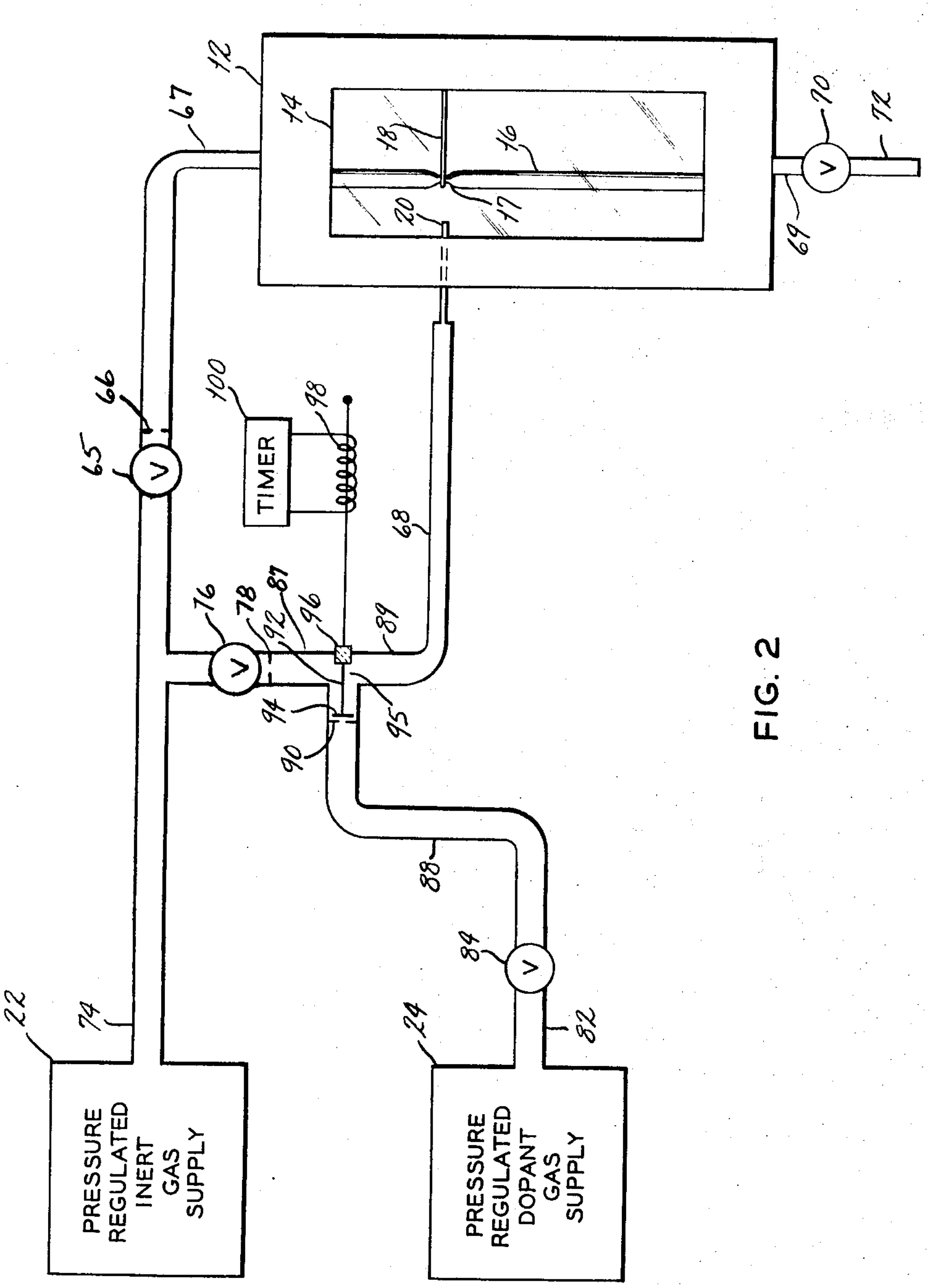

FIG. 1 is a schematic diagram of one embodiment of the invention employing two gas mixing chambers; and FIG. 2 is a schematic diagram of another embodiment of this invention employing a single gas mixing chamber.

DETAILED DESCRIPTION OF FIG. 1

Referring to FIG. 1, the reference numeral 10 generally designates the gas proportioning system embodying the invention and which is utilized for controlling impurity concentration in semiconductive materials processed in a zone refining chamber 12. As may be seen through the window 14 in the zone refining chamber 12, an elongated semiconductor rod 16 is being zone refined according to conventional zone refining techniques wherein relative motion is provided between an RF induction heating work coil 18 and the semiconductor rod 16. The zone refining chamber 12 is continuously purged with an inert gas via line 67 and also with an inert gas-dopant gas mixture emanating from a doping tube 20 which extends into the chamber 12 in proximity to the molten zone 17 in the semiconductor rod 16. These purging gases and the control thereof are described in detail hereinafter. These purging gases, such as argon, displace the air or other gases within the zone refining chamber 12 prior to beginning a zone refining pass in which the work coil 18 passes the length of the semiconductor rod 16.

The gas purging and doping system according to the present invention includes a pressure regulated inert gas supply tank 22 and a pressure regulated dopant gas supply tank 24. The tank 22 may, for example, be filled with either pure phosphine gas, (for N type doping) $PH_3$, or a gaseous mixture of phosphine gas and a selected inert gas such as argon. Therefore, the term "dopant gas" as used herein to identify the dopant source within supply tank 24 refers to either a pure dopant gas or a dopant gas diluted with a selected inert gas. Furthermore, the term "inert" as used herein to modify the carrier gas means that this gas is inert to and will not react with silicon. For example, hydrogen gas is a suitable carrier gas for use in practicing the invention since it will not react with zone refined silicon. However, hydrogen is quite reactive with other elements and compounds as is well known.

A gas flow line 26 extending from supply tank 22 is utilized to distribute a selected inert gas, such as argon, through the gas flow line 28, the flow control valve 30 and through a critical orifice 34 prior to entering a first gas mixing chamber 32. Another gas flow line 36 connects the dopant gas supply tank 24 to the first mixing chamber 32 via gas flow lines 41 and 42, respectively. The gas flow line 41 is utilized for a low range of gas flow rates to be described, and gas flow line 41 is connected through a flow control valve 38 and a critical orifice 40 to an opening in the mixing chamber 32. The gas flow line 42 is utilized for a high range of gas flow rates to be described and is connected through a flow control valve 44 and a critical orifice 46 to another opening in the mixing chamber 32.

The mixture of inert and dopant gases in the first mixing chamber 32 flows under a substantially constant low pressure via interconnecting gas flow line 48 to a 3-way programmable solenoid valve 50. The solenoid valve 50 is energized by an inductance coil 52 which is periodically controlled in a manner described below by a suitable electronic timer 53. The timer 53 may be programmed by connecting an electronic programmer (not shown) thereto so that the dopant gaseous mixture in the gas entry line 48 will pass through the valve 50 and to the gas exit line 54 for a chosen percentage of a given time period or cycle. This percentage is selected in accordance with the desired impurity concentration and resistivity of the doped semiconductor rod 16. During this chosen percentage of the cycle, the inert gas-dopant gas mixture in the first mixing chamber 32 is passed to a second mixing chamber 58 where it is further diluted with the inert gas, e.g., argon, flowing through the flow control valve 60 and the critical orifice 64. The gaseous mixture in the second gas mixing chamber 58 passes through the gas outlet line 68 and the doping tube 20 which is integral therewith to the vicinity of the molten zone 17 as shown. The rate of dopant gas passing through the doping tube 20 is dependent upon the preestablished and substantially constant gas pressures in the gas lines 26 and 36, and the actual time that P or N type dopant atoms are passed via doping tube 20 to the zone refining chamber 12 is controlled by the timer 52. This doping of the chamber 14 takes place during the "on" portion of the period of the duty cycle upon which the timer 53 is operating, and this doping control of the semiconductor rod 16 is described in further and more specific detail below.

When it is desired to prevent all dopant impurities from entering the second gas mixing chamber 58 via gas line 54, the solenoid valve 50 is inductively positioned so that the T-shaped opening therein to rotated counterclockwise 90° with respect to its position shown in FIG. 1. Now the dopant gas flowing in line 48 will be routed through the gas exhaust line 56 and thus bypass the zone refining chamber 12 during the "off" portion of the above duty cycle.

Prior to beginning a zone refining operation, the inert gas in line 26 is passed through flow control valve 65 and a critical orifice 66 to a gas purging line 67 which enters the zone refining chamber 12. This inert gas, e.g. argon, is used to purge or displace substantially all of the air or other gases within the chamber 12 and thereby minimize the oxygen content therein for a zone refining operation. Typically, this inert gas purge rate is from between 10 and 36 cu. ft. per hour, and the inert purge gas continuously passes through the zone refining chamber 12 as shown and exits the chamber 12 via the exhaust gas line 69 and the exhaust control valve 70. The pressure in the chamber 12 is typically in the order of 1 p.s.i.g. during the zone refining operation, and this chamber pressure may be closely controlled by the various settings of the above valves 30, 38, 44 and 65 and by other well known equivaent control mechanisms (not shown).

The high pressure portion of the system 10 includes the gas supply tanks 22 and 24 and also the gas lines 26, 28, 36, 41 and 42 which run between these gas supply tanks and the valves 65, 30, 38 and 44, respectively. The memory effects (absorption and adsorption) of the abovementioned prior art systems were only a problem in these high pressure portions of the system which included the supply tanks and the lines extending therefrom to the first series of valves. Changes in pressure were used to control dopant flow in this high pressure portion of the system, so these changes produce the greatest amount of absorption and adsorption in the system. These pressure changes in this high pressure portion of the system had a negligible affect on memory or gas storage by the walls of the low pressure portion of the system between the above mentioned control valves and the zone refining chamber. Any slight deviation from the low gas pressure of approximately 1 p.s.i.g. between the above valves 30, 38, 44 and 65 and the zone refining chamber produces little or no change in the memory of the gas line walls in this low pressure portion of the system, and thus will have negligible affect upon the doping control of the present process and system.

Inert gas constantly flows through the orifice 64 in the above defined low pressure portion of the system, and pulses of the dopant gas/inert gas mixture are added by way of the solenoid valve 50 and via line 54 into the chamber 58. The mere changing of the position of the valve 50 will produce slight pressure changes in the low pressure part of the system, and such pressure changes must inherently involve some finite (but negligible) amount of absorption and adsorption in the gas line walls in this part of the system. However, at all times during the pulsing of the doping gas/inert gas mixture into the chamber 58, the inert gas continues to flow via orifice 64 and through this second mixing chamber 58, and this inert gas flow continues to "wash" the absorbing dopant gas which is in this chamber 58 on into the zone refining chamber. During this pulsing action, the solenoid valve 50 oscillates back and forth between its position shown in FIG. 1 and a position rotated 90° counterclockwise with respect to this position. The gas pressure in lines 54 and 56, respectively, for these two distinct positions of the solenoid control valve 50 are at substantially the same constant pressure. Therefore, the effect of this oscillatory movement of the solenoid valve 50 is negligible insofar as producing any disturbing absorption or desorption of the dopant gases in the low pressure portion of the system to the right of orfices 34, 40, 46, 64 and 66 as shown in FIG. 1.

It should also be observed that finite changes will be produced in the level of impurity concentration in the zone refining chamber during a zone refining operation. The partial gas pressure in the zone refining chamber is dependent to a small degree upon this change in the concentration of impurities, and will possibly change a finite amount as a result. However, any such change in partial pressure of gases in the zone refining chamber has been found negligible insofar as producing any measurable memory effects in the chamber. In fact, no memory effects have been observed in the chamber, even through several attempts have been made to measure such effects. The reason for this is believed to be a result of the fact that the inert purging gas flowing through line 67 and into the zone refining chamber is flowing 10 to 20 times the volume of the dopant/inert gas mixture flowing through the doping tube 20. As a result, any dopant gas entering the chamber and which is not absorbed by the semiconductor rod is either washed out of the chamber by these inert gases, and/or absorbed on the chamber walls and there oxidized to a less volatile compound.

DESCRIPTION OF ZONE REFINER DOPING CONTROL

The following description of the operation of the embodiment of the invention illustrated in FIG. 1 will refer to typical gas pressures and gas flow rates which have been utilized in practicing this invention. However, it is to be understood that these latter values do not together form a specific example of the present process and do not corresponding to any specific level of doping or resistivity for the semiconductor rod 16. Specific examples of zone refining runs which have been successfully made in practicing the invention are given further down in the specification.

Typically, the gas pressure in the lines 26 and 36 will be at 90 p.s.i.g. (104.7 p.s.i.) and the dopant gas in line 36 will include from between 5 and 500 parts per million (p.p.m.) of the dopant element, e.g. phosphorous, for a phosphine-argon gaseous mixture. The flow control valves 38 and 44 (as well as the other flow control valves 30, 60 and 65) are shut-off type valves and they are either in a folly opened or a closed position. The low flow rate gas line 43 is a result of the small size of the orifice 40 whose opening passes approximately 1 milliliter per minute (ml./min.) under 90 p.s.i.g. to the first mixing chamber 32, whereas the larger opening in the orifice 46 of the high flow rate gas line 45 passes approximately 10 mil./min. to the first mixing chamber 32. Therefore, these two gas lines 43 and 45 provide high and low gas volumes so that the timer 53 may sample either a high or low gas volumes as it controls the duty cycle of the dopant gas passing through the solenoid valve 50. The pressure in the gas lines 35, 43 and 45 is at approximately 1 p.s.i.g., the same as the pressure in the first and second gas mixing chambers 32 and 58 and in the zone refining chamber 12.

The inert gas enters the mixing chamber 32 and via gas line 35 at a rate typically in the order of 30 ml./min., whereas the flow rate of the inert gas entering the second mixing chamber 58 via control valve 60 and orifice 64 is typically in the order of 250 ml./min. The inert gas entering the chamber 32 flushes the dopant from the chamber as it enters via line 43 or line 45, and the inert gas entering the chamber 58 via critical orifice 64 provides the necessary gas velocity for forcing the gaseous mixture in chamber 58 through line 68 and doping tube 20 to the molten zone 17. The predetermined volume of gas provided by the mixing chamber 32 prevents the small differences in pressure between the gas chamber 32 and the gas exhaust lines 56 and 72 from delaying the small volume of gas flowing from the dopant gas orifices 40 and 46 to the chamber 32.

TIMER 53 CONTROL VS. SEMICONDUCTOR ROD 16 RESISTIVITY

The relationship between the percentage of a selected time period that the dopant gas passes via line 48, through solenoid valve 50, and gas line 54 to the second gas mixing chamber 58 and the desired resistivity of the semiconductor rod 16 is established as follows. The timer 53 is initially controlled to pass the dopant gas through the solenoid valve 50 and into the mixing chamber 58 for a fixed time period, which may conveniently be any chosen time period as long as the corresponding oscillation frequancy of valve 50 does not produce significant doping and thus resistivity fluctuations in the zone refined semiconductor rod 16. For example, in practicing the present invention and for ease of calibration, a period of 10 seconds has been advantageously set equal to a 100 percent "on" time for the timer 53. A 50 percent duty cycle for such an "on" time means that the valve 50 is in the position shown in FIG. 1 for the first 5 seconds of the period and is then rapidly rotated counterclockwise 90° where it remains for substantially all of the following 5 seconds to complete the 10 second period. Obviously, longer periods with corresponding longer on and off times for the timer 53 could result in undesirable doping and resistivity fluctuations in the semiconductor rod 16. Thus it would obviously be undesirable to establish a period equal to the time required to make a single zone refining pass, with "on" times corresponding to fractions of this period. However, periods in the order of 10 seconds have been found to work quite well in practicing the present invention, and for such periods it has been impossible to detect rythmic fluctuations in resistivity along the length of the semiconductor rod due to this duty cycle operation. This result is because of the fact that the zone 17 acts as a reservoir and smooths the resistivity profile therein for sufficiently short time periods of the timer 53, and the zone can be compared to a capacitor which smooths out a varying voltage in a DC electrical circuit.

After the zone refining pass is complete, the resistivity of the semiconductor rod 16 is measured and from such resistivity measurement the number of dopant atoms per gram of the semiconductor rod 16 can be calculated. That is, the specific resistivity of the semiconductor rod 16 is equal to a known proportionality constant times the reciprocal of the number of dopant atoms per gram of semiconductor material in the rod 16, and such proportionality constant will be different for the particular dopant used and for the type of semiconductor rod being zone refined, e.g., silicon or germanium. By multiplying this value of dopant atoms/gram of semiconductor material in the rod 16 by the travel rate of the zone 17 in grams per minute (which is also known), the value for the dopant atoms per minute entering the semiconductor rod 16 can be ascertained. As a result of the rapid dopant gas velocities passing the molten zone during a zone refining pass, the molten zone 17 absorbs only approximately 70% of the dopant atoms entering the chamber 12 via doping tube 20. Thus, the above value of dopant atoms per minute entering the semiconductor rod 16 must be divided by 0.70 to determine the number of dopant atoms per minute which entered the chamber 12 to give the above measured resistivity for 100% "on" time for the timer 53.

The resistivity of rod 15 may be varied by varying the fraction of the "on" time of timer 53. When the timer 53 is "on," the position of the solenoid valve 50 is that position shown in FIG. 1, wherein dopant gas is allowed to pass through the valve 50 and to the zone refining chamber 12. For example, if the measured resistivity of the semiconductor rod 16 is 20 ohm-centimeters corresponding to 100% "on" time of the timer 53, then to provide a rod resistivity of 100 ohm-centimeters, only a fraction of the dopant atoms per minute previously entering the zone refining chamber 12 must now pass to the chamber 12. For resistivities above approximately 10 ohm-centimeters, the relationship between dopant gas entering the chamber 12 and the rod 16 and the resistivity of rod 16 is linear, so that in the example given above, a 20% "on" time would result in increasing the 20 ohm-centimeters resistivity to 100 ohm-centimeters. However, below approximately 10 ohm-centimeters resistivity, this relationship becomes non-linear; but the non-linear relationship between dopant atoms per gram contained in the semiconductor rod 16 and the resistivity of the rod 16 is well known for selected dopants and semiconductive materials below 10 ohm-cm. Therefore, from this latter information, the "on" time of the timer 53 corresponding to a resistivity value less than 10 ohm-cm. can be easily calculated.

From the above discussion it is seen that one may determine the number of dopant atoms/min. flowing from the gas supply tank 24 and via orifice 40 or 46 before entering the zone refining chamber 12. In addition, the total rate of gas flow through line 48 to the timer 50 is also known. Therefore, from these two quantities plus the mass flow rate (i.e., zone travel rate) of silicon through the work coil 18, the timer 53 may be set to direct the desired percentage of dopant atoms to the molten zone 17 to thereby give the desired dopant concentration in and resistivity of the semiconductor rod 16.

Table I below lists eight (8) zone refining runs during which the present invention was used, and this table covers a wide range of crystal diameters, vertical zone refining travel rates (zoning rates) and corresponding timer settings needed to obtain the desired corresponding resistivities which are set forth in the table. In practicing the invention, a 10 second duty cycle was used since, as mentioned above, it simplifies calculations and the making of the various timer settings. Certain of the parameters in the table could be measured, and from these measured parameters the remaining parameters were calculated as follows.

Initially, it is desired to know the effective concentration of dopant, $m\gamma$/ml., in the doping gas supply tank 24. For this calculation, a silicon rod 16 of uniform diameter was zone refined and simultaneously doped. A doping tube 20 having a relatively large orifice in the end thereof was used for this measurement, and the duty cycle of the timer 53 was set at 100% to give 100% flow through the doping tube 20. By measuring the diameter and the resulting resistivity of the silicon rod 16 after this zone refining operation, the effective dopant concentration $m\gamma$/ml. in the doping gas supply tank 24 was calculated in accordance with Equation 1 below:

$$m\gamma/\text{ml.}\times\text{ml./min.}=m\gamma/\text{g.}\times\text{g./min.} \quad \text{(Eq. 1)}$$

where $m\gamma$/ml. is the effective concentration of dopant in the doping gas; $m\gamma$ being the weight of a specific dopant that will be one part per billion atoms in one gram of a particular semiconductive material, and ml. is the abbreviation for milliliter.

ml./min. is the calibrated flow rate in milliliters per minute of doping gas (i.e., a combination of dopant and inert gas) from the doping tube 20 orifice at a predetermined controlled pressure.

$m\gamma$/g. is the concentration of dopant in the zone refined and dopant rod 16 and is calculated from its measured resistivity; g. is an abbreviation for gram.

g./min. is the mass flow rate of the semiconductor rod 16 through the zone, and is calculated from the vertical zone travel rate or zoning rate, the crystal rod 16 diameter, and the density of the semiconductor rod 16.

For N-type silicon, the term $m\gamma$/g. may be written as $$m\gamma/\text{g.}\cong 96/\text{resistivity} \quad \text{(Eq. 2)}$$

and for P-type silicon $m\gamma$/g. may be written as $$m\gamma/\text{g.}\cong 250/\text{resistivity} \quad \text{(Eq. 3)}$$

Therefore, Equation 1 above may now be solved to determine the effective concentration of dopant, $m\gamma$/ml., in the doping gas supply tank 24. With the effective doping gas concentration $m\gamma$/ml. established, Equation 1, may be simplified to:

$$m\gamma/\text{min.}=m\gamma/\text{g.}\times\text{g./min.} \quad \text{(Eq. 4)}$$

The timer 53 settings may now be calculated, since the crystal diameter, zoning rate in g./min., and the target dopant concentration, $m\gamma$/g., in the silicon are now known. The required dopant flow rate $m\gamma$/min. necessary to produce a rod with a desired resistivity may be calculated as follows:

$$m\gamma/\text{min. needed}=m\gamma/\text{g. target}\times\text{g./min. of silicon through zone} \quad \text{(Eq. 5)}$$

Since the total rate of dopant gas flow, $m\gamma$/min., for a 100 percent "on" time of the timer 53 has previously been calculated in accordance with Equation 5 above, the fraction "on" time may now be calculated according to either Equation 7 or Equation 8 below.

$$\text{Fraction "on" time needed}=\frac{m\gamma/\text{min. needed}}{m\gamma/\text{min. at 100 percent "on" time}} \quad \text{(Eq. 6)}$$

or $$\text{Fraction "on" time needed}=\frac{m\gamma/\text{g. target}\times\text{g./min. of silicon}}{m\gamma/\text{min. at 100 percent "on" time}} \quad \text{(Eq. 7)}$$

Using the above calculations, the following Table I for 8 zone refining runs was prepared:

TABLE I.—GAS DOPING OF SILICON IN THE ZONING STEP FLOW RATES AND RESULTING PRODUCT RESISTIVITY

| | Silicon flow rate | | | Dopant flow rate | | | Resulting product | |
|---|---|---|---|---|---|---|---|---|
| Run No. | Crystal diameter (mm.) | Zoning velocity (mm./min.) | Silicon mass rate through zone (g./min.) | Doping gas* flow rate (ml./min.) | Fractional cycle "On" time used | Effective dopant flow rate** (mγ/min.) | Dopant conc. in crystal (mγ/g.) | Crystal resistivity (Ω-cm.) |
| 1 | 25.0 | 4.0 | 4.52 | 1.0 | .15 | 3.15 | .70 | 137.0 |
| 2 | 25.0 | 6.0 | 6.78 | 1.0 | .60 | 12.60 | 1.86 | 51.6 |
| 3 | 25.0 | 6.0 | 6.78 | 1.0 | 1.00 | 21.00 | 3.10 | 31.0 |
| 4 | 52.0 | 2.0 | 9.84 | 1.0 | 1.00 | 21.00 | 2.14 | 45.0 |
| 5 | 52.0 | 2.0 | 9.84 | 9.0 | .10 | 18.90 | 1.92 | 50.0 |
| 6 | 52.0 | 3.0 | 14.76 | 9.0 | .15 | 24.80 | 1.92 | 50.0 |
| 7 | 52.0 | 4.0 | 19.68 | 9.0 | .20 | 37.80 | 1.92 | 50.0 |
| 8 | 52.0 | 4.0 | 19.68 | 9.0 | .40 | 75.60 | 3.84 | 25.0 |

*Total flow from selected orifice. With two orifices available in the system, the one which will give the proper range is chosen. Cycle time (total of time "On" and "Off") was ten seconds.

**The doping gas concentration (i.e., concentration of phosphine in argon) was 21 . mγ/ml. An "mγ" being the weight of impurity element which contains the same number of atoms as $10^{-9}$ grams of silicon.

Table II below was prepared from actual runs made tor 41 millimeter diameter, N-type crystals of 75 to 135 ohm-centermeter resistivity.

TABLE II

Gas Doping of Silicon during the Zoning Step using 42.9 mγ/min. Phosphine (in Argon) Flow, a Ten-Second Duty Cycle, Zoning at 3.5 mm./min., and with 41 mm. Diameter Target

| | "On" time | | Product silicon | |
|---|---|---|---|---|
| Silicon rate through zone (g./min.) | Seonds | Percent of cycle | Phosphorus conc. (mγ/g.) | Silicon resistivity (Ω-cm.) |
| 11.8 | 2.3 | 23 | 0.80 | 120 |
| 11.3 | 2.3 | 23 | 0.88 | 109 |
| 11.7 | 2.3 | 23 | 0.81 | 119 |
| 11.8 | 3.3 | 33 | 1.28 | 75.0 |
| 11.7 | 3.3 | 35 | 1.22 | 78.9 |
| 11.9 | 3.3 | 33 | 1.20 | 79.9 |

Referring now to FIG. 2, there is shown an alternate embodiment of the invention wherein a single gas mixing chamber 95 is used to replace the two gas mixing chambers 32 and 58 described with reference to FIG. 1 above. In FIG. 2, separate inert and dopant gas supply tanks 22 and 24, respectively, are used to generate the dopant gas mixture in chamber 95, and the inert gas, e.g., argon, passes through a gas line 74, a flow control valve 76 and a critical orifice 78 before entering the mixing chamber 95. The dopant gas from the supply tank 24 passes via line 72 and the flow control valve 84 to the mixing chamber 95. The mixing chamber 95 is formed by the adjoining walls of the three gas lines 87, 88 and 89, and the particular shape or form of the chamber 95 is not critical to the operation of the system shown in FIG. 2.

The dopant gas flowing via gas line 88 into the chamber 95 is controlled by a solenoid type plunger member 92 which cooperates with an orifice valve 90. The plunger member 92 is joined to a flat end or head portion 94 thereof which controls the volume of gas entering the chamber 95. This solenoid valve, including members 90 and 92, maintains a substantially constant pressure at all times in the chamber 95, and this pressure is typically at 1 p.s.i.g., the pressure in the zone refining chamber 12. This solenoid valve structure, including the plunger 92 and orifice 90, and the chamber 95 size are selected so that the plunger 92 traps no volume between members 90 and 92 upon closing the valve. Any gas volume entrapment between these members will have an adverse memory effect on system which has been described above in applicant's description of the prior art.

The timer 100 inductively controls the plunger 92 to permit the dopant gas to enter the chamber 95 during a selected percentage of a given time period, so that the percentage of impurity concentration in the doping mixture entering the zone refining chamber 12 is time-controlled independent of gas pressures in the system. The gas line 68 and the doping tube 20 extend into the zone refining chamber 12 in the same manner as described above with reference to FIG. 1 and the zone refining chamber 12 is continuously purged during a zone refining operation with an inert gas, e.g., argon, entering the chamber 12 via line 67 and exiting said chamber via line 69 as previously described.

Many modifications and variations may be made in the above-described embodiments of the invention without departing from the true scope thereof. For example, additional gas mixing chambers may be used in the system of FIG. 1 if it is desired to further dilute or increase the velocity of the doping gas which passes into the chamber 12. Similarly, additional gas lines similar to lines 43 and 45 in FIG. 1 may be added if further dopant gas flow rates are required for gas doping during a zone refining operation.

The timer 53 is preferably, but not limited to, an electronic timer which may be programmed for any desired duty cycle. However, mechanical timers have been used for the timer 53 and are considered within the scope of this invention.

Finally, the present invention is not limited to making the initial resistivity measurement for the semiconductor rod 16 based upon a 100% "on" time of the timer 53 wherein said timer maintains the solenoid valve 50 open and passing a dopant gas to the zone refining chamber 12 for 100% of the zone refining pass. This initial resistivity measurement from which other timer 53 "on" times vs. resistivities are calculated may be based upon a selected duty cycle which is less than a 100% timer "on" time. An the latter selected duty cycle may be subsequently used in calculating other semiconductor rod 16 resistivities and corresponding "on" times for the timer 53.

I claim:

1. A process for controlling the resistivity of a semiconductive material during zone refining thereof which includes the steps of:

(a) passing a gaseous mixture of selected dopant atoms and inert gas to a body of said semiconductive material for first time duration, (b) passing said mixture away from said body of semiconductive material for a second time duration, and then (c) periodically repeating steps (a) and (b) in sequence for repeated time intervals each of a chosen duration as said body of semiconductive material is being zone refined along its length, whereby the ratio of said first to said second time durations constitutes the duty cycle during which dopant atoms are intermittently passed to and away from said semiconductive material and said duty cycle is controlled in accordance with the desired resistivity of said semiconductive material, and (d) maintaining a substantially constant pressure on said dopant atom mixture and on the source from which said dopant atom mixture emanates during said repeated intervals.

2. A process for controlling the resistivity of a semiconductive material during zone refining thereof which includes the steps of:

(a) periodically and alternately passing a mixture of dopant gas and inert gas to and away from a chamber in which a body of semiconductive material is being doped during zone refining thereof along the length of said body of semiconductive material, whereby the ratio of the time during which said mixture is passed to and away from said chamber constitutes the duty cycle of said process, (b) maintaiinng a substantially constant pressure on said dopant gas mixture and the source from which said dopant gas mixture emanates by maintaining the gas pressure of the exhaust dopant gas mixture passed away from said chamber substantially equal to the pressure within said chamber, and (c) varying said duty cycle in accordance with the desired resistivity of said semiconductive material.

3. The process defined in Claim 2 wherein said inert gas is selected from the group consisting of argon, krypton and helium.

4. The process defined in Claim 2 wherein said inert gas is argon and said dopant gas is phosphine.

References Cited

UNITED STATES PATENTS

| | | | |
|---|---|---|---|
| 3,108,073 | 10/1963 | Vanik et al. | 252—62.3 E |
| 3,558,376 | 1/1971 | Schmidt et al. | 148—189 |

JACK COOPER, Primary Examiner

U.S. Cl. X.R.

148—189; 252—62.3 E